United States Patent [19]

Clark

[11] 4,106,700

[45] Aug. 15, 1978

[54] SUPPORT FOR SPRAYER BOOMS

[76] Inventor: Otho A. Clark, Rte. 1, Independence, Mo. 64050

[21] Appl. No.: 770,787

[22] Filed: Feb. 22, 1977

[51] Int. Cl.² ............................................. B05B 1/20
[52] U.S. Cl. ................................................. 239/168
[58] Field of Search ............... 239/159, 163, 164, 166, 239/167–169, 176

[56] References Cited

U.S. PATENT DOCUMENTS

| 2,910,245 | 10/1959 | Burroughs | 239/167 |
| 3,580,505 | 5/1971 | Loeffler | 239/168 |
| 3,581,993 | 6/1971 | Reams | 239/168 X |
| 3,972,476 | 8/1976 | Hall | 239/167 |

FOREIGN PATENT DOCUMENTS 1,425,162  2/1976  United Kingdom ..................... 239/167

Primary Examiner—Evon C. Blunk
Assistant Examiner—Andres Kashnikow
Attorney, Agent, or Firm—Schmidt, Johnson, Hovey & Williams

[57] ABSTRACT

A sprayer having an articulated boom is provided with a pair of shock absorbing structures mounted between the sprayer frame and the main section of the boom in such a manner that the main section is limited to dampened, rectilinear reciprocation relative to the frame. Each structure has a quick release mounting for permitting the boom to be easily removed from the sprayer and for facilitating adjustment of the nominal spacing between the ground and the boom.

9 Claims, 6 Drawing Figures

U.S. Patent      Aug. 15, 1978      4,106,700
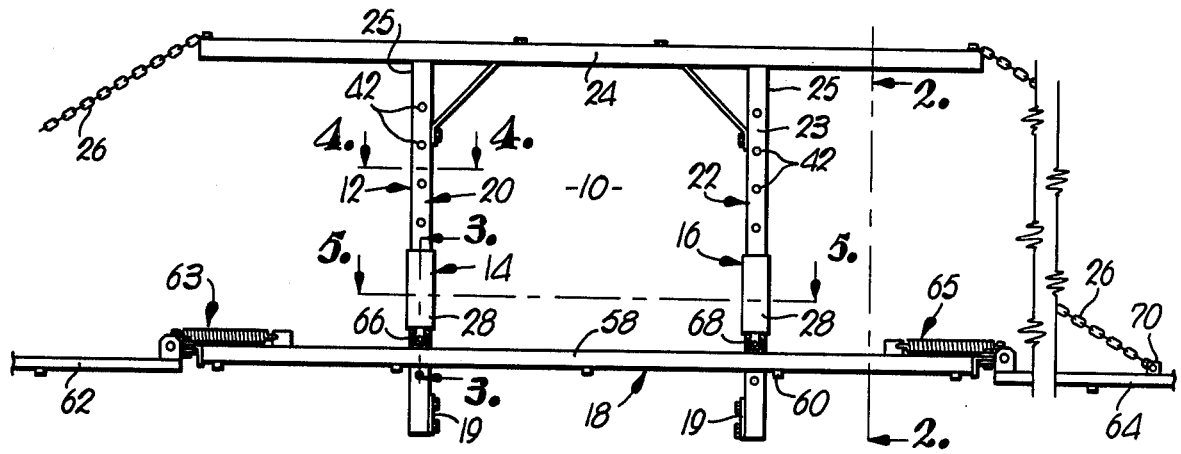
Fig. 1.
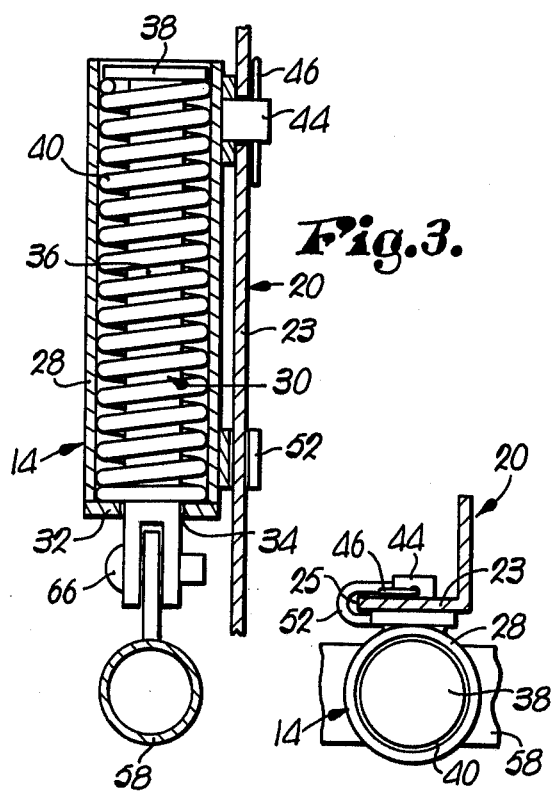
Fig. 3.
Fig. 4.
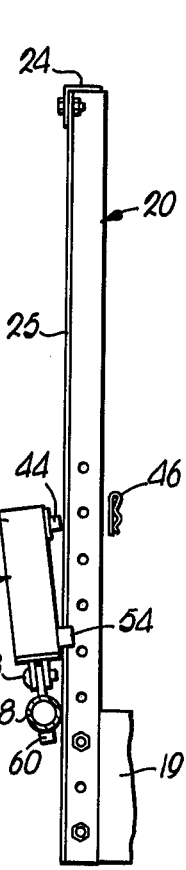
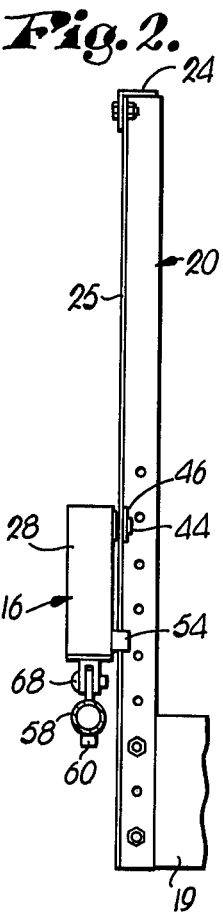
Fig. 2.
Fig. 6.
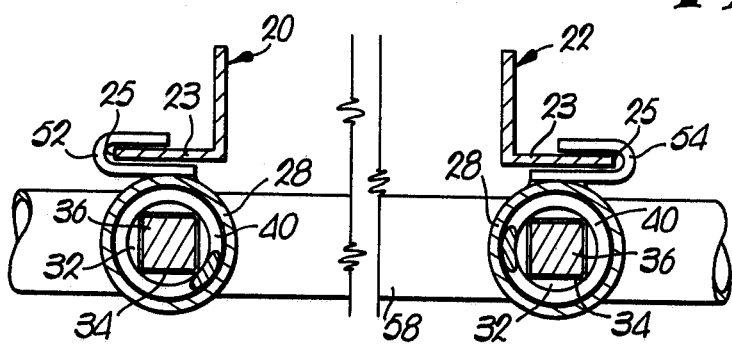
Fig. 5.

SUPPORT FOR SPRAYER BOOMS

The use of articulated sprayer booms in modern spraying equipment is widespread primarily because such construction permits an increased spray pattern and thus enhances the overall efficiency of the sprayer. One problem inherent in the use of articulated sprayer booms is that of limiting the swinging movement of the sections relative to one another during operation of the sprayer. This problem is particularly acute in agricultural applications where it is typically required to operate the sprayer over rough uneven ground contours.

In this regard, it will be appreciated that as the sprayer is advanced over a field or the like it will be caused to bounce up and down and rock from side to side in response to discontinuities in the terrain. Such bouncing and rocking motion is transmitted to the boom assembly by virtue of its rigid connection to the sprayer frame. However, since typically only one section of the articulated boom is directly supported on the frame, inertia in the unsupported sections effects relative swinging between the supported section and the cantilevered outer sections. This swinging movement or "pitching" of the outer sections results in uneven spray patterns and causes undesirable stresses in the boom.

One attempt to overcome the aforementioned problem is presented in U.S. Pat. No. 3,580,505 entitled SPRAYER BOOM ASSEMBLY. However, the device disclosed in this patent employs a pendulum-like mounting between the sprayer frame and the boom which may actually effect increased swinging of the boom sections rather than reducing such undesired movement. This for the reason that side-to-side movement of the sprayer causes swinging of the main section of the boom relative to the frame, which in turn is amplified to effect severe pitching of the outer sections. Moreover, by virtue of the pivotal mounting of the main section, the latter tends to remain in a substantially horizontal disposition regardless of the attitude of the frame such that the boom is skewed relative to the ground when the sprayer is operated on slopiing contours. This skewed relationship between the ground and the boom is undesirable in that it causes varying spray patterns and uneven coverage of the material being applied.

Accordingly, it is an important object of my invention to reduce the uncontrolled pitching of the outer sections of a sprayer boom incident to the operation of the sprayer over rough terrain.

It is a further important object of the instant invention to isolate the sprayer boom from shock forces encountered by the sprayer while at the same time limit the relative movement between the sprayer frame and the supported section of the boom to rectilinear reciprocation.

A still further important object of my invention is to provide a sprayer with a boom which may be quickly and easily adjusted to vary the nominal spacing between the boom and the ground.

Another important aim of my instant invention is to improve upon the concepts of said patent by removing its above-mentioned short-comings.

In the drawing:

FIG. 1 is a fragmentary elevational view of a support for sprayer booms made according to my present invention;

FIG. 2 is an enlarged, fragmentary cross-sectional view taken along line 2—2 of FIG. 1;

FIG. 3 is an enlarged, fragmentary, detailed cross-sectional view taken along line 3—3 of FIG. 1;

FIG. 4 is an enlarged, fragmentary cross-sectional view taken along line 4—4 of FIG. 1;

FIG. 5 is an enlarged, fragmentary cross-sectional view taken along line 5—5 of FIG. 1; and FIG. 6 is an enlarged, fragmentary cross-sectional view similar to FIG. 2 and showing the releasable feature of the shock absorbing structure.

In FIG. 1 there is shown a sprayer 10 including a frame 12, a pair of shock absorbing structures 14 and 16 and an articulated boom assembly 18 mounted on the frame 12 by the structures 14, 16.

The frame 12 has a pair of beams 19 adapted for mounting on the chassis of any conventional vehicle (not shown) to render the frame 12 mobile. The frame 12 further includes a pair of normally upright, parallel, laterally spaced stanchions 20 and 22 each supported on a respective beam 19 and an elongate, horizontally disposed spar 24 rigidly secured to the uppermost ends of the stanchions 20, 22. A pair of flexible strands 26 are mounted on opposite ends of the spar 24.

As shown in FIG. 5, the stanchions 20, 22 are of L-shaped cross-section, each having one leg which presents a relatively thin, flat strap 23. The straps 23 are coplanar and each strap 23 has an outwardly facing free edge 25 opposed from the vertex defined by the L-shaped cross-section. The stanchions 20, 22 are arranged in mirror image fashion such that the respective edges 25 face in opposite directions.

Each of the structures 14, 16 has an elongate, cylindrical, tubular mounting 28 which telescopically receives an elongate member in the form of a plunger 30 and constrains the latter for reciprocal movement along its longitudinal axis relative to the mount 28. In this connection, one end of the mount 28 is provided with a constriction 32 having a square hole 34 which receives an elongate stem 36 forming a part of the member 30. One end of the stem 36 has an enlarged follower 38 configured to substantially conform to the inside diameter of the mount 28 and adapted for sliding movement with the member 30 relative to the mount 28. A yieldable device in the nature of coiled compression spring 40 is disposed within the mount 28 between the follower 38 and the constriction 32 in concentric relationship with the longitudinal axis of the stem 36. Hence, downward movement of the member 30 is cushioned by virtue of a resisting force imparted to the member 30 by the spring 40.

As shown in FIG. 1, for example, each of the stanchions 20, 22 is provided with an elongate, vertically extending series of spaced apertures 42. Each of the mounts 28 is provided with a pin 44 extending radially from the cylindrical portion of the mount 28 and adapted to be releasably received within a selected one of the apertures 42. Each of the pins 44 has a retainer clip 46 to prevent undesired disengagement of pin 44 from the selected aperture 42. In this manner, the structures 14, 16 are releasably secured on respective stanchions 20, 22 as shown in FIG. 1, such that the members 30 are restrained to reciprocation along a substantially vertical path of travel.

The mounting of the structure 14 on stanchion 20 is further enhanced by a U-shaped retainer bracket 52 which captively engages the strap 23 of stanchion 20 iin such manner that the free edge 25 is disposed within the bight of the bracket 52. Thus, the structure 14 is precluded from rotating relative to the frame 12 in a counter-clockwise direction when viewed in FIG. 1. This anti-rotation feature is the result of a cooperative relationship between the retainer bracket 52 and the pin 44 which together form a part of one mount 28. Similarly, the structure 16 is provided with a U-shaped retainer bracket 54 adapted to captively engage the strap 23 of stanchion 22 in such manner that the free edge 25 thereof is disposed within the bight of the bracket 54. The bracket 54, in combination with a pin 44, forms a part of the other of the mounts 28 which precludes rotation of the structure 16 in a clockwise direction when viewed as in FIG. 1.

The assembly 18 includes an elongate main section 58 having a plurality of spray nozzles 60 disposed along the length thereof and a pair of outer wing sections 62, 64 pivotally supported on opposite ends of the section 58 by a pair of hinge assemblies 63 and 65. Each of the sections 62, 64 is also provided with a number of nozzles 60 spaced along the length thereof. Assemblies 63, 65 may be of the type disclosed in my previously issued U.S. Pat. No. 2,532,996 which permit vertical as well as fore-and-aft swinging of the sections 62, 64.

A pair of attachments 66 and 68 couple the main section 58 to the members 30 of structures 14 and 16 respectively such that the boom assembly 18 is floatingly suspended from the frame 12 in a normally horizontal disposition. By virtue of this arrangement the mounts 28 cooperate with the section 58 to preclude swinging movement of the members 30 relative to the frame 12. Hence, the section 58 is limited to rectilinear, normally vertical, reciprocal movement relative to the frame 12. As shown in FIG. 1, the attachments 66, 68 are spaced equidistant from the longitudinal bisector of the main section 58, and the spacing between the attachments 66, 68 is greater than the spacing between each of the latter and respective proximal ends of the section 58.

Each flexible strand 26 is secured to the outermost end of a respective wing section 62, 64 by a securement 70 (shown only in FIG. 1 and only on wing section 64). In this manner, the wing sections 62, 64 are limited in their downward swinging movement relative to the central section 58.

In use, the sprayer 10 is typically mounted at the rear of a tank carrying vehicle and the boom assembly 18 is placed in fluid communication with the tank. The operator first adjusts the boom assembly 18 to the desired height above the ground by placement of pins 44 in the appropriate apertures 42 on stanchions 20 and 22.

With the boom height properly adjusted, the sprayer 10 is transported to the desired spraying location. It should be noted that during transport, the wing sections 62, 64 may be disposed in a folded position if so desired such that the overall width of the sprayer 10 is not excessive. Once at the spraying site, the operator unfolds the boom assembly 18 and then advances the sprayer 10 while actuating the sprayer to cause the spraying medium to flow through the nozzles 60.

As the sprayer 10 progresses across the area to be sprayed, it will encounter numerous bumps, dips and other ground discontinuities particularly if the area to be sprayed is an agricultural field. As these bumps and dips are passed over by the sprayer 10, bouncing and rocking motion is transmitted to the frame 12 which motion would normally be transmitted to the central section 58 thereby causing undesired severe pitching of the wing sections 62, 64, in the manner described hereinabove.

However, by virtue of the fact that the shock absorber structures 14, 16 are interposed between the frame 12 and the main section 58, the up and down motion is to a great extent dissipated such that only limited motion is experienced at the main section 58 and only slight pitching is imparted to the wing sections 62, 64.

Side-to-side or yawing movement of the sprayer 10 causes similar rocking movement of the central section 58 which in turn produces some swinging movement in the wing sections 62, 64. However, the mounts 28 preclude pendulum-like swinging movement of the section 58 such that pitching of wing sections 62, 64 resulting from side-to-side movement of the sprayer 10, is virtually eliminated, in contradistinction to the prior art device described hereinabove.

The present invention provides an effective means for solving the problems incident to the use of articulated booms in sprayer devices. Specifically, undesired, erratic, pitching in the outer sections 62, 64 of the sprayer boom assembly 18 experienced during operation of the sprayer 10 is almost totally eliminated by the structure set forth hereinabove. Moreover, the present invention provides the operator with a simple and convenient means for adjusting the nominal distance between the boom and the ground.

When the sprayer 10 is operated on the side of a hill, the main section 58 will at all times remain substantially parallel to the ground by virtue of the unique arrangement of mounts 28. Hence, the uniformity of the spray pattern is maintained under virtually all types of operating conditions.

Having thus described the invention, what is claimed as new and desired to be secured by Letters Patent is:

1. A sprayer including:
 a mobile frame;
 a boom assembly having an elongated main section and an elongated outer section,
 said sections being normally in end-to-end relationship and provided with a pivot interconnecting their proximal ends for limited up and down swinging movement of the outer section relative to the main section;
 a pair of elongated, horizontally spaced members having normally vertical, longitudinal axes in parallel relationship, the members being vertically reciprocable along said axes thereof;
 an attachment on each member respectively securing the same to the main section for maintaining the longitudinal axes of the members perpendicular to the longitudinal axis of the main section;
 a yieldable device for each member respectively disposed to cushion downward movement thereof; and
 a mounting for each member respectively securing the same to the frame and restraining movement of the main section relative to said frame to only rectilinear, normally vertical reciprocation transversely of the longitudinal axis of said main section, whereby to appreciably reduce the amount of up and down pitching of the outer section about said pivot as the frame traverses uneven terrain,
 said frame including a spar disposed above said boom assembly, there being a flexible member extending between said spar and said outer section for limiting downward swinging movement of the latter relative to the frame.

2. The invention of claim 1, said frame including a pair of normally upright, horizontally spaced stanchions, each of said mounts including a hollow tube in axial alignment with a respective stanchion, each of said members being telescopically received within a respective tube for restraint to reciprocal movement relative to the latter.

3. The invention of claim 2, said yieldable device comprising a coil spring within said tube disposed for compression between said tube and said member when the latter descends relative to the mount.

4. The invention of claim 2, said stanchions each having a longitudinally extending series of apertures, said mounts each including a pin for releasably engaging a selective one of said apertures whereby the assembly may be adjusted vertically relative to the frame.

5. The invention of claim 4, said mounts each having a retainer bracket spaced from said pin and in captive sliding engagement with a respective stanchion.

6. The invention of claim 5, said pin including a retainer clip for releasably holding said pin within a selected aperture.

7. The invention of claim 1, said attachments being disposed in spaced relationship along the length of said main section equidistant from the longitudinal bisector of the latter.

8. The invention of claim 4, the distance between said attachments being greater than the distance between each of said attachments and the respective proximal ends of said main section.

9. The invention of claim 1, there being a pair of said outer sections disposed on opposite ends of said main section.

* * * * *